United States Patent [19]

Kemner et al.

[11] 4,302,777
[45] Nov. 24, 1981

[54] FLARE COMPENSATION CIRCUIT FOR TELEVISION

[75] Inventors: Rudolf Kemner; Bernardus G. J. Kuilman; Hilbrand J. Smit, all of Eindhoven, Netherlands

[73] Assignee: U.S. Philips Corporation, New York, N.Y.

[21] Appl. No.: 150,268

[22] Filed: May 15, 1980

[30] Foreign Application Priority Data

Jun. 7, 1979 [NL] Netherlands .......................... 7904471

[51] Int. Cl.³ .............................................. H04N 5/14
[52] U.S. Cl. ..................................... 358/160; 358/169
[58] Field of Search ............... 358/163, 169, 171, 172, 358/174, 221, 282, 160

[56] References Cited

U.S. PATENT DOCUMENTS 3,621,132 11/1971 Page .................................... 358/160
4,001,502 1/1977 Van Roessel ....................... 358/165

Primary Examiner—John C. Martin
Attorney, Agent, or Firm—Thomas A. Briody; William J. Streeter; Edward W. Goodman

[57] ABSTRACT

A flare or scattered light compensation circuit for television, wherein a controllable signal difference amplifier is present to a first input of which a picture signal, affected by flare or scattered light, is applied, a compensation signal obtained by signal integration being applied to a second input. The gain factor of the amplifier is controlled substantially proportional to the quotient of the peak-peak value of the picture signal and of the difference value of the said peak-peak value and the value of the compensation signal.

5 Claims, 1 Drawing Figure

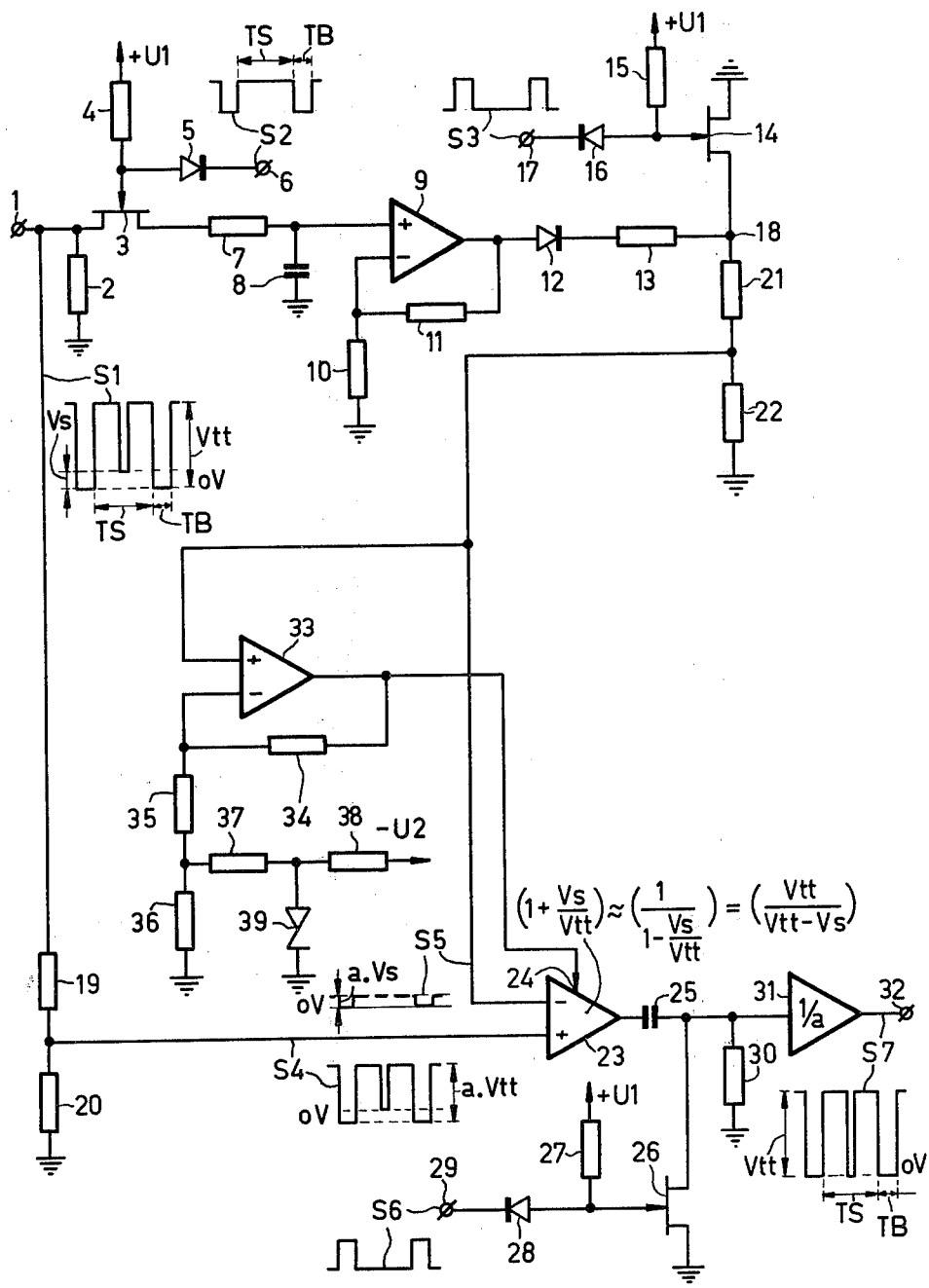

FLARE COMPENSATION CIRCUIT FOR TELEVISION

BACKGROUND OF THE INVENTION

The invention relates to a flare compensation circuit for television, the circuit comprising a signal integration circuit having an input for receiving a picture signal affected by flare or scattered light and an output for supplying a compensation signal derived therefrom, also comprising a signal difference amplifier circuit having a first input for receiving the picture signal and a second input for receiving the compensation signal.

Such a flare/scattered light compensation circuit is described in U.S. Pat. No. 4,001,502 wherein the signal difference amplifier circuit is included in a fed-back black level clamping circuit.

SUMMARY OF THE INVENTION

The invention has for its object to provide a circuit for only flare compensation, that is to say not in combination with a fed-back black level clamping circuit. Separating these two functions has the advantage that the flare compensation can be effected without any signal level being affected, as, for example, the black level in the above-mentioned patent application, may be already clamped in a preceding circuit. The flare compensation circuit according to the invention is therefore characterized in that the signal difference amplifier circuit comprises a controllable amplifier, a control input of which is connected to the output of a second amplifier circuit having an input for receiving the said compensation signal, the gain factor of the controllable amplifier being substantially proportional to the quotient of the peak-peak value, which has been fixed at a predetermined value, of the picture signal affected by the flare, and of the difference value of this peak-peak value and the value of the compensation signal.

To perform flare compensation only, a circuit according to the invention is further characterized in that the gain factor of the signal difference amplifier circuit is substantially equal to unity.

A simple construction of a flare compensation circuit according to the invention is characterized in that the controllable amplifier is constructed as a controllable signal difference amplifier.

In order to obtain a signal difference amplifier circuit having a linearly varying gain factor, a flare compensation circuit according to the invention is characterized in that the second amplifier circuit comprises a voltage source for setting the gain factor of the controllable amplifier in a linear control range.

In order to obtain flare compensation during television line scanning periods only, a flare compensation circuit according to the invention is characterized in that the amplifier input for receiving the compensation signal is connected to a short-circuiting circuit for line and field blanking periods.

DESCRIPTION OF THE DRAWINGS

The invention and its advantages will now be further described with reference to the sole FIGURE, given as an example of a circuit diagram for a flare compensation circuit.

DESCRIPTION OF THE PREFERRED EMBODIMENT

In the FIGURE, reference numeral 1 denotes an input terminal to which a signal S1, which is shown in the drawing as a function of the time, is applied. The signal S1 is a television picture signal wherein TS denotes a line scan period and TB a line blanking period, these times together forming a television line period, not further indicated. In the signal S1, Vtt denotes a peak-peak value and Vs a signal value which is present in the center of the line scan period TS. It is shown that the signal S1 has a voltage of 0 V during the line blanking period TB. This means that in a preceding circuit, not shown, the black level occurring in the periods TB is clamped to the 0 V ground potential. Let it be assumed that at the generation of the picture signal in the line scan period TS, shown in the drawing, an information having the peak-white value as present, interrupted by a black information portion which, however, does not result in the 0 V ground potential in the signal S1, but results in the voltage value Vs in response to flare. In a television system this flare may be produced when the system comprises an optical lens which processes the light information from a scene to be televised. In addition, a flare effect occurs in X-ray television systems with its conversion of X-ray information, possibly by means of an optical intermediate step, into the electric picture signal. A phenomenon comparable to flare occurs with a film-television conversion because of the so-called fog in the film. Irrespective of the signal source with its specific flare effect, which supplies the picture signal S1, it is assumed that the value Vs may amount to 20 to 40% of the peak-peak value Vtt.

Via a cable terminating resistor 2 the input terminal 1 is connected to ground, it also being connected to the source of a transistor 3, which is of the type having an insulated gate electrode, for example a field effect transistor. The gate electrode of the transistor 3, of the n-channel type, is connected to a terminal carrying a voltage +U1, via a resistor 4, and is connected to the anode of a diode 5, the cathode of which is connected to an input terminal 6 to which a switching signal S2, shown next to it, is applied. The terminal carrying the voltage +U1 is part of a voltage-source, not shown, a further terminal of which is connected to ground. The signal S2 applied to the input terminal 6 is a switching signal having pulses occurring in the line blanking periods TB in response to which the transistor 3 is non-conductive in the periods TB and conductive in the periods TS. The drain of the transistor 3 is connected to ground via a resistor 7 and a capacitor 8, the junction point of the resistor 7 and the capacitor 8 being connected to the (+) input of a differential amplifier 9. Via resistors 10 and 11, respectively, the (−) input of the amplifier 9 is connected to ground and to the output of the amplifier 9, respectively, this output being connected to the anode of a diode 12, the cathode of which is connected to a resistor 13. A signal integration circuit (3–8) is thus formed by means of which an integration of the picture signal S1 is effected during the line scan periods TS, the integrated signal, amplified via the amplifier circuit (9, 10, 11), becoming available as the compensation signal via the diode 12 and the resistor 13. The use of the diode 12 causes the compensation to be effected in a non-linear manner. The signal integration circuit (3–8) is shown with a simple construction; in a more complicated embodiment it may comprise a resetting means of field frequency.

The other terminal of the resistor 13 is connected to the drain of an n-channel transistor 14 of the field effect type, the source of which is connected to ground. Via a resistor 15, the gate electrode of the transistor 14 is connected to a terminal which carries the voltage +U1, it also being connected to the anode of a diode 16, the cathode of which is connected to an input terminal 17 to which a switching signal S3, shown next to it, is applied. The signal S3 has rising pulses in the line blanking periods TB, not further shown, the transistor 14 being conductive, and substantially the 0 V ground potential occurring at the junction point, denoted by 18, of the resistor 13 and the transistor 14. In the line scan periods TS the transistor 14 is non-conductive, so that the junction point 18 can carry the flare compensation signal. Thus, a short-circuiting circuit (14–17) to ground ensures that the flare compensation is only effected in the line scan periods TS which occur in a television field scan period. The circuit (14–17) is a short-circuiting circuit for line and field blanking periods.

The input terminal 1 and the junction point 18 may be considered as a first (1) and a second input (18), respectively, of a signal difference amplifier circuit still further to be described. In this circuit the inputs (1) and (18), respectively, are each connected to ground via two series-arranged resistors 19, 20 and 21, 22, respectively. The junction points of the resistors 19, 20 and 21, 22, respectively, are connected to a (+) input and (−) input, respectively, of a signal difference amplifier 23, which is constructed so that it is controllable and comprises a control input 24. The (+) input and the (−) input of the amplifier 23 carry the signals S4 and S5, shown next to it, the signal S4 corresponding to the attenuated picture signal S1 and the signal S5 being an attenuated compensation signal. The attenuation is indicated by the factor a which means that, starting from the picture signal S1, at a peak-peak value a.Vtt in the signal S4, the signal S5 has a value a.Vs. The attenuation via voltage dividers (19, 20) and (21, 22) is effected for signal matching to a commercially available, controllable, signal difference amplifier 23. When a picture signal S1 with a fixed peak value Vtt equal to 700 mV relative to the 0 V ground potential is supplied and the Motorola signal difference amplifier MC 1545 is used, a voltage having a peak value of 40 and 16 mV, respectively, should occur in a practical embodiment at the (+) input and the (−) input, respectively, of the amplifier 23. If a construction which can fully cope with a fixed peak value is available for the controllable signal difference amplifier 23, the voltage dividers (19, 20) and (21, 22) can be omitted. It further holds that, instead of a controllable signal difference amplifier 23, a controllable amplifier having one input might be used which is preceded by a signal subtracting stage to which the signals S4 and S5 are applied.

Via an isolating capacitor 25 the output of the amplifier 23 is connected to the drain of a n-channel transistor 26 of the field effect type, the source of which is connected to ground. Via a resistor 27 the gate electrode of the transistor 26 is connected to a terminal which carries the voltage +U1, it also being connected to the anode of a diode 28, the cathode of which is connected to an input terminal 29 to which a switching signal S6, shown next to it, is applied. In line blanking periods TB, not further shown, the signal S6 has rising pulses, the transistor 26 then being conductive and substantially the ground potential of 0 V occurring at the junction point of the capacitor 25 and the transistor 26. In the line scan periods TS the transistor 26 is non-conductive. The direct current component is restored after the isolating capacitor 25 by means of the circuit (26–29). Via a resistor 30, the junction point of the capacitor 25 and the transistor 26 is connected to ground and, via a signal amplifier 31, to an output terminal 32 of the flare compensation circuit. At the output terminal 32 there is shown a signal S7 which is compensated for flare, that is to say the black-information portion in the center of the line-scan period TS has been adjusted to black level having the ground potential of 0 V, which has been effected in a signal difference amplifier circuit (19–31).

In order to obtain flare compensation, the control input 24 of the amplifier 23 is connected to the output of a signal difference amplifier 33 the (+) input of which is connected to the junction point of the resistors 21 and 22. The (−) input of the amplifier 33 is connected to the amplifier output via a resistor 34 and to ground via two series-connected resistors 35 and 36. The junction point of the resistors 35 and 36 is connected to a terminal having a supply voltage −U2 via two series-connected resistors 37 and 38, the junction point of the resistors 37 and 38 being connected to the anode of a zener diode 39, the cathode of which is connected to ground. Thus, an amplifier circuit (33–39) has been formed incorporating a voltage source U2, not shown, one terminal of which is connected to ground, which is provided for setting the nominal gain of the amplifier 23 in a linear control range.

In order to explain the operation of the flare compensation the following applies. Starting from the signals S4 and S5 in the drawing, it follows that a difference signal S4-S5, having a peak-peak value a.Vtt−a.Vs=a.(Vtt−Vs) is impressed on the amplifier 23. Amplifying this difference signal by a factor Vtt/(Vtt−Vs) results in that the output signal of the amplifier 23 gets a peak-peak value equal to a.Vtt, which, after the amplifier 31 having a gain factor equal to 1/a, results in the signal S7 having a peak-peak value Vtt. As it is not easy to realise the gain factor Vtt/(Vtt−Vs) electronically, it is approximated by means of the amplifier circuit (33–39) shown in the FIGURE, as a result of which the amplifier 23 has a gain factor equal to (1+Vs/Vtt), it holding that:

$$\frac{Vtt}{Vtt - Vs} = \frac{1}{1 - \frac{Vs}{Vtt}} \approx 1 + \frac{Vs}{Vtt},$$

when it holds that $(Vs/Vtt)^2$ is much smaller than unity. For the values already indicated, Vs being located between 0.2 and 0.4 times Vtt, there is an approximate error of between 4 and 16%, which is permissible in practice.

It appears that the above-mentioned attenuation and gain factors result in a gain factor which is substantially equal to unit for the signal difference amplifier circuit (19–31). An advantageous fact is that the influence of the flare is compensated in the signal S7, whereas the peak-peak value still has the fixed value.

The following values of some of the components which are relevant to the invention are given by way of supplement to the above-mentioned data for a practical construction of a flare or scattered light compensation:

| | |
|---|---|
| resistor 19 : 15.4 kΩ | resistor 36 : 50 Ω |
| 20 : 931 Ω | 37 : 1.82 kΩ |
| 21 : 13.3 kΩ | 38 : 475 Ω |
| 22 : 931 Ω | zener diode : 4.7 V |
| 34 : 7.5 kΩ | voltage U2 : 12 V |
| 35 : 1 kΩ | |

What is claimed is:

1. A flare compensation circuit for television, the circuit comprising a signal integration circuit having an input for receiving a picture signal affected by flare or scattered light and an output for supplying a compensation signal derived therefrom, also comprising a signal difference amplifier circuit having a first input for receiving the picture signal and a second input for receiving the compensation signal, characterized in that the signal difference amplifier circuit comprises a controllable amplifier a control input of which is connected to the output of a second amplifier circuit having an input for receiving the said compensation signal, the gain factor of the controllable amplifier being substantially proportional to the quotient of the peak-peak value, which has been fixed at a predetermined value, of the picture signal affected by the flare, and of the difference value of this peak-peak value and the value of the compensation signal.

2. A scattered light or flare compensation circuit as claimed in claim 1, characterized in that the gain factor of the signal difference amplifier circuit is substantially equal to unity.

3. A scattered light or flare compensation circuit as claimed in claim 1 or 2, characterized in that the controllable amplifier is constructed as a controllable signal difference amplifier.

4. A scattered light or flare compensation circuit as claimed in claim 1 or 2, characterized in that the second amplifier circuit comprises a voltage source for setting the gain factor of the controllable amplifier in a linear control range.

5. A scattered light or flare compensation circuit as claimed in claim 1 or 2, characterized in that the second input of said signal difference amplifier circuit, for receiving the compensation signal, is connected to a short-circuiting circuit for line and field blanking periods.

* * * * *